United States Patent Office 2,864,784
Patented Dec. 16, 1958

2,864,784

AQUEOUS SLURRY PLASTICIZATION OF POLYVINYL ACETAL RESINS

Barnard Mitchel Marks, Wilmington, Del., assignor to E. I. du Pont de Nemours and Company, Wilmington, Del., a corporation of Delaware No Drawing. Application August 15, 1956
Serial No. 604,069

3 Claims. (Cl. 260—29.6)

This invention relates to a process for plasticizing polyvinyl acetal resins, and, more particularly, it relates to a process in which polyvinyl butyral particles are slurried with water and a liquid plasticizer, and the resultant slurry is agitated until the plasticizer is absorbed by the particles.

This is a continuation-in-part of copending application Serial Number 449,018, filed August 10, 1954, now abandoned.

It is known that polyvinyl acetal resins find a wide use in the preparation of safety-glass laminations in which the polyvinyl acetal resin is an interlayer between two sheets of glass. In order for the resin to be useful in such an interlayer, it must be plasticized so that the resin is soft and tacky and will adhere tenaciously to glass. The prior art methods of plasticizing polyvinyl acetal resins have taken four general directions; the first eing a plasticization of the resin in solution, the second being a plasticization of the resin in the form of a melted mass, the third being the plasticization of dry granular resin, and the fourth being the plasticization of resin in a colloidal suspension. The first method requires subsequent process steps to remove the resin solvent after the extrusion of the plasticized resin into the form of a sheet or other article for ultimate use elsewhere. The second method requires the use of powerful conveying equipment such as screw devices and the like to transport the heavy viscous melted polyvinyl acetal resin. The third method requires the employment of large and expensive drying equipment to dry the polyvinyl acetal resin prior to plasticization. The fourth method requires the use of a dispersing agent and heat or work to incorporate the plasticizer into the resin, following which, the dispersing agent must be removed if the resin is to be used as an interlayer in glass laminates.

It is an object of this invention to provide a novel and simple process for plasticizing polyvinyl acetal resin. It is another object of this invention to provide a method for plasticizing polyvinyl acetal resin in the form of an aqueous slurry of resin particles which are not self-dispersible. Another object of this invention is to provide a process for effecting a uniform and accurately predictable distribution of plasticizer throughout a particulate mass of polyvinyl acetal resin. It is still another object of this invention to provide a speedy and simplified process for plasticizing polyvinyl acetal resins in a form such that the plasticized resin may be transported through pipelines by ordinary pumping equipment to the next processing step without the necessity of removing a solvent, removing a wetting agent or a dispersing agent, or in changing the resin slurry in any form. Still another object is to provide a composition of water and plasticized polyvinyl acetal resin which may be employed as a feed to an extrusion device. Other objects will appear in the more detailed explanation of this invention which follows.

The above objects are accomplished in accordance with the process of this invention by forming an agitated aqueous slurry of polyvinyl acetal resin particles, which readily separate from the aqueous medium in the absence of agitation, adding the desired amount of water-insoluble ester plasticizer such that the proportion of (water) to (resin plus plasticizer) is from about 3:1 to about 20:1 by weight, and continuing the agitation, in the absence of a dispersing agent, for a period of time sufficient to allow the plasticizer to be absorbed by the resin particles. This slurry may then be transported by pumps and pipelines to a succeeding process step, e. g., an extruder for dewatering, mixing, melting, and extruding the resin into the form desired.

In the preferred embodiment of this invention, a slurry is formed containing from about 4 to 10 parts by weight of water to 1 part of resin. While this slurry is being agitated, plasticizer in the amount of about 10% to about 50% by weight of the unplasticized resin is added and the agitation is continued. The preferred plasticizers are from the group consisting of triethylene glycol di-(2-ethyl butyrate), di(beta-butoxyethyl)adipate, and dibutyl sebacate. The agitated slurry is maintained at a temperature from about 20° to about 65° C. over a period of 10 to 100 minutes until substantially all of the plasticizer is absorbed by the resin, thereby producing a uniform aqueous slurry of plasticized polyvinyl acetal resin. The preferred polyvinyl acetal resin for use in the preparation of safety glass is a partial polyvinyl butyral resin which is defined as meaning a polymer having from about 18% to about 25% by weight of vinyl alcohol groups, not more than about 2% by weight of vinyl acetate groups, and the remainder being vinyl butyral groups.

The term "slurry" wherever used in this description and in the appended claims is intended to mean a mixture of a liquid and an insoluble solid which is in the form of particles which are of such a size, structure, and density that the particles do not remain suspended in the liquid when the mixture is not agitated. Polyvinyl butyral has a specific gravity of about 1.15, depending on its composition, and polyvinyl formal has a specific gravity of about 1.2–1.3. A typical screen analysis (U. S. Sieve Series) on polyvinyl butyral employed in this process is shown below:

| Screen size: | Weight percent retained on screen |
|---|---|
| 10 | 3.5 |
| 18 | 12.3 |
| 35 | 52.7 |
| 60 | 26.8 |
| 120 | 4.6 |
| 325 | 0.2 |

The largest fraction of this material is, therefore, from about 0.02 to 0.04 inch in particle diameter, which, combined with its density, is a material which might be expected to settle rapidly in quiescent water. All particles of polyvinyl butyral, however, are not alike, probably because the particles, in some instances, are agglomerates of smaller units. Some of these agglomerated particles entrap air in their interstices, and tend to float, while other particles settle rather rapidly in water. In any event, the particles of polyvinyl butyral do not form a suspension after the nature of colloidal suspensions or those suspensions formed with the aid of a wetting agent or a dispersing agent.

The process of this invention is particularly designed to produce polyvinyl butyral for eventual use as an interlayer in automotive safety glass. For such a use the polyvinyl butyral must have an unimpaired adhesiveness in order that it may bond tightly to the glass with which it is laminated. It has been found that, if a dispersing agent is employed in the process of this invention, the adhesiveness of the resulting product is reduced to the extent that it cannot be employed for use in laminating glass. On the other hand, it is necessary to the present process that the resin particles be dispersed throughout the aqueous phase in some fashion so that the plasticizer may contact each resin particle, and that each particle absorb plasticizer into its interior rather than merely on the surface. If a surface adsorption only is achieved the resin "bleeds," which term is employed in the trade to mean that the plasticizer exudes from the resin as small droplets, leaving the resin in an unplasticized condition. The process of this invention employs an agitated mixture of water, resin and plasticizer, in the absence of a dispersing agent, to produce a completely plasticized resin product which does not "bleed." The agitation is employed to provide an intimate mixture of the plasticizer and resin particles, and, at the same time, to prevent the tacky resin particles from agglomerating during the time in which the resin is absorbing the plasticizer.

In United States Patent 2,720,501, issued to R. T. Van Ness on October 11, 1955, there is described a process for the preparation of polyvinyl acetal resins in which polyvinyl alcohol is prepared as described above and is then condensed with aldehyde in the presence of water. The condensation product of this process is a heterogeneous mixture, or slurry, of polyvinyl acetal resin particles in water, rather than a thick viscous solution as prepared in the heretofore known processes. A typical screen analysis of such resin particles shows that at least 90% by weight of the particles is retained on a 60-meth screen (U. S. Sieve Series), and about 70%–80% is retained on a 35-mesh screen. It is therefore apparent that the condensation product is already in the form of an aqueous slurry as required for the present process of plasticizing and that such an aqueous condensation product does not have to be subjected to a series of process steps before it may be utilized in the process of the present invention. Polyvinyl butyral, prepared by other known processes, may also be employed in the present invention, although the particles must be free of any wetting agent or dispersing agent, and of sufficient size not to be self-dispersible.

In examples which are given below to illustrate various embodiments of this invention, parts and percentages are by weight unless otherwise specified.

*Examples 1 to 7.*—In each of these examples the dry unplasticized polyvinyl butyral flake was added to distilled water in a steam jacketed resin kettle fitted with a propeller-type agitator. The particle size of the flake was such that about 15% would be retained on a 35-mesh screen, about 73% would be retained on an 80-mesh screen, and the remainder would pass through an 80-mesh screen (U. S. Sieve Series). The mixture of resin and water was agitated and heated to form a slurry at the indicated temperatures. There was then added triethylene glycol di(2-ethyl butyrate) as a plasticizer, and the agitation and temperature kept constant during the reaction time. The product slurry was then removed from the kettle and the water was analyzed for plasticizer to determine, by difference, the amount of plasticizer absorbed by the resin particles. The details of these examples are listed in the following table. Example 6 illustrates the formation of agglomerates of the plasticized resin due to a low water:resin ratio and a slow agitator speed.

*Table*

| | Charge | | | Process conditions | | | | | | |
|---|---|---|---|---|---|---|---|---|---|---|
| Example | Distilled water, pounds | Plasticizer, pounds | Wet polyvinyl butyral resin (40% water), Pounds | Temperature, °C. | Agitator speed, R. P. M. | (Water): (resin plus plasticizer), ratio | Plasticization time, minutes | Kettle size, gallons | Percent plasticizer absorbed by resin | Remarks |
| 1 | 230 | 6.45 | 25.0 | 45–50 | 1,725 | 11:1 | 25 | 50 | 99.3 | Good dispersion. |
| 2 | 230 | 9.10 | 35.0 | 45 | 1,725 | 8:1 | 15 | 50 | 98.7 | Do. |
| 3 | 250 | 4.3 | 17.25 | 41 | 1,725 | 17.5:1 | 10 | 50 | 9.9 | Do. |
| 4 | 625 | 23.8 | 90.0 | 36 | 96 | 8:1 | 15 | 100 | 99.5 | Do. |
| 5 | 625 | 26.8 | 100.0 | 25 | 96 | 7.5:1 | 30 | 100 | 99.1 | Do. |
| 6 | 500 | 32.6 | 125.0 | 38 | 96 | 5:1 | 15 | 100 | 99.5 | Small agglomerates formed. |
| 7 | 160 | 8.1 | 31.25 | 33 | 1,725 | 6:1 | 30 | 50 | 98.2 | Good dispersion. |

*Example 8.*—A slurry is prepared containing 40 gallons of water and 28 pounds of polyxinyl butyral resin. While this slurry is being agitated there is added 11.3 pounds of di(beta-butoxy ethyl)adipate. The pH of the slurry is 7.2. The slurry is agitated at 40° C. for about 20 minutes. The slurry was then fed into a screw extruder after passing through a device for removing a large portion of the water and extruded in the form of a sheet. At the end of this time, measurements are made on samples of the resin sheet to determine the amount of absorbed plasticizer present in the resin. The amount of dibutyl Cellosolve adipate present is about 29% by weight of the plasticized resin. The determination is made by measuring the index of refraction of the plasticized resin and transforming this measurement to plasticizer content, by means of previously obtained correlations between index of refraction values and concentrations determined by distillation and separation of the resin constituents.

*Example 9.*—The procedure of Example 8 is repeated except that the plasticizer used is dibutyl sebacate in the amount of 10.5 pounds, and the slurry is agitated at 50° C. rather than 40° C. as was the case in Example 8. The plasticized resin was then formed into a sheet by extrusion from a screw extruder. The amount of absorbed dibutyl sebacate plasticizer is found to be 26.0% by weight of the plasticized resin. In a second identical experiment the amount of absorbed dibutyl sebacate was found to be 25.2% by weight of the plasticized resin.

*Example 10.*—Tests are made to determine the extrusion pressure and temperature when plasticized polyvinyl butyral resin particles, similar to those prepared in Examples 1–9, are employed and fed to a screw extrusion device. It is found that when the feed material is dry, the extrusion pressure is 1500 to 1600 pounds per square inch and the temperature of the material rises to about 185° C. by reason of the friction forces on the resin mixture in the extrusion device. In the same device if the feed material is a mixture of approximately 30% water and 70% plasticized resin, the extrusion pressure is only 1100 pounds per square inch and the temperature of the resin rises to only about 160° C.

In the examples given above, there are illustrations of a process for plasticizing partial polyvinyl butyral resin with triethylene glycol di(2-ethyl butyrate), di(beta-butoxy ethyl)adipate, and dibutyl sebacate as plasticizers. It is to be understood that this invention is not intended to be limited to the use of these particular plasticizers since this process is equally applicable to the plasticization of other polyvinyl acetal resins and to the use of other known water-insoluble ester plasticizers.

The amount of plasticizer which may be used will vary with the resin to be plasticized, the plasticizer employed, and the degree of plasticization required. In general, the use of plasticizer in an amount less than about 10% by weight of the unplasticized resin will be insufficient to achieve any noticeable plasticization, and amounts of more than about 50% to 60% imparts undesirable characteristics to the resin. The preferred amount of plasticizer is from about 15% to about 50% by weight of the unplasticized resin. In the plasticization of polyvinyl butyral with triethylene glycol di(2-ethyl butyrate), di(beta-butoxy ethyl)adipate, or dibutyl sebacate, the amount of plasticizer recommended is from about 20% to about 45% by weight of the unplasticized polyvinyl butyral.

The resins which may be plasticized by the process of this invention include the polyvinyl acetal resins resulting from the condensation of polyvinyl alcohol with a lower aliphatic aldehyde, preferably those containing 2 to 6 carbon atoms, such as acetaldehyde, propionaldehyde, butyraldehyde, valeraldehyde, and hexaldehyde. Since the polyvinyl alcohol starting material normally contains some unhydrolyzed acetyl groups, and since the nature of the acetal reaction is such that some alcoholic hydroxyl groups fail to react with the aldehyde, the resulting resin is a heterogeneous structure of vinyl acetate units, vinyl alcohol units, and vinyl acetal units. Such a heterogeneous resin is known to those skilled in the art, and is herein called, a "partial polyvinyl acetal resin." The partial polyvinyl acetal resin employed in this invention is that product resulting from the partial acetalization of a polyvinyl alcohol containing not more than about 2% by weight of unhydrolyzed vinyl acetate groups. The degree of acetalization may vary with the product desired and the aldehyde used. In general, the degree of acetalization may be from about 30% to about 95% complete, the lower degree of acetalization being employed with the higher aldehydes and the higher degree of acetalization being employed with the lower aldehydes. In the preferred embodiment of this invention wherein polyvinyl butyral is prepared for use as a safety-glass interlayer the degree of acetalization with butyraldehyde will be from about 64% to about 75% complete. The final polyvinyl butyral product will therefore contain not more 18%–25% vinyl alcohol groups, and the remainder vinyl butyral groups.

The slurry which is used in the process of this invention consists essentially of water, resin, and plasticizer. No dispersing agent is present in the slurry. The amount of water is that which is necessary for the maintenance of a fluid, low-viscosity slurry. It has been found that if the (water):(resin plus plasticizer) ratio is less than about 3:1, it is extremely difficult to prevent agglomeration of the resin particles without the consumption of abnormally large amounts of power in agitation of the slurry. The upper limits of the (water):(resin plus plasticizer) ratio are dictated primarily by considerations of economy and practicality since the use of high ratios of (water):(resin plus plasticizer) would entail larger and larger equipment, higher heating loads, and so forth, without any compensating advantages. The preferred upper limit of (water):(resin plus plasticizer) ratio is about 20:1 since beyond this point no further advantages have been experienced in preventing agglomeration of the particles and in effecting economy by reducing the power requirements of agitation as against the increased cost of larger equipment. The preferred range of (water):(resin plus plasticizer) is from about 4:1 to about 10:1. In some embodiments of this invention a portion of the unplasticized resin may be replaced by shredded scrap resin which has been previously plasticized. The proportion of unplasticized resin to plasticized scrap will vary according to the amount of scrap on hand, but normally it is not less than about 2:1.

The temperature of the plasticizing process is governed by many factors. If the temperature is too low, the plasticization time becomes inordinately long and therefore uneconomical. If the plasticization temperature is too high, the resin particles tend to soften and to agglomerate into a solid or semi-solid mass, and, therefore, more agitation or higher (water):(resin plus plasticizer) ratios are required to maintain the desired mixture of resin and plasticizer. The temperature limits for the process of this invention are from about 20° C. to about 65° C. The preferred temperatures are from about 35° C. to about 55° C. for the plasticization of polyvinyl butyral.

The time required to accomplish plasticization may vary from about 10–100 minutes depending upon conditions of temperature agitation, and concentration, although preferred conditions will permit the plasticization to take place in about 10–30 minutes. The elapse of time is required merely to allow the polyvinyl acetal resin to absorb substantially all of the plasticizer, in distinction to the surface adsorption of plasticizer which eventually results in "bleeding" of the plasticizer. In 10 to 30 minutes in most embodiments of this invention, at least 90% of the plasticizer will be absorbed by the resin, and since the slurry of plasticized resin formed in this process is employed as a feed to an extrusion device, there is an assurance that the first resin fed to the extruder has essentially the same plasticizer concentration as the last portion of resin entering the extruder. An excess of plasticizer would permit some portions of resin to contain more plasticizer than other portions since at longer contact times a given amount of resin will absorb a greater amount of plasticizer from the aqueous medium. This process therefore provides a method of obtaining a uniform distribution of the plasticizer throughout the resin and an exact concentration of plasticizer in the resin without employing heat or powerful mixing devices or solvents for the resin. Stepwise introduction of plasticizer may be employed in certain embodiments of this invention.

It is important to the process of this invention that the resin be maintained in an unagglomerated form, without the aid of a dispersing agent, during and after the plasticizing step. As explained above, this condition may be aided by increasing the (water):(resin plus plasticizer) ratio, or by lowering the operating temperature, or both. However, it has been found necessary to employ sufficient agitation of the slurry in order to maintain the resin particles in a dispersed condition and thereby permitting the (water):(resin plus plasticizer) ratio and the operating temperature to be maintained within practical limits. The amount of agitation normally employed in this process is that which consumes from about 1 to about 5 horsepower per 1000 gallons of slurry. Typical peripheral speeds of a paddle agitator are from about 600 to 1200 feet per minute in the process of this invention.

An unexpected advantage of the process of this invention is that the slurry of plasticized resin may be employed after removal of sufficient water to form a mixture of about 30% water and 70% plasticized resin solids in a feed to an extrusion apparatus designed to produce polyvinyl acetal sheeting which may be utilized in the preparation of laminated safety glass. Since safety-glass interlayer must meet rigid optical requirements, it has been necessary that the interlayer be prepared under carefully controlled conditions. One of the primary reasons that polyvinyl butyral, in the past, has not been worked in a screw extruder in the absence of a solvent is that the polyvinyl butyral is a highly viscous material at ordinary temperatures, and that in order to reduce the viscosity sufficiently to mix and work the resin under conditions similar to that found in an extrusion apparatus, the temperature had to be raised to such an extent that the resin became discolored and its optical qualities were thereby destroyed. The slurry of plasticized resin, after being dewatered somewhat, may be fed into a screw extrusion device which successively wrings out much of the remaining water from the resin and transforms the remaining mixture of water and plasticized resin into a single-phase, homogeneous low viscosity plastic mass which may be successfully extruded into sheet form without being heated to the high temperatures involved in previously known extrusion devices, and accordingly produces safety-glass interlayer having acceptable optical qualities.

This process is particularly useful in the manufacture of polyvinyl butyral resin which may be transformed into sheeting for ultimate use as an interlayer in safety glass. Other uses for plasticized polyvinyl acetal resins are well known to those skilled in the art.

I claim:

1. A process for plasticizing a partial polyvinyl acetal resin comprising (a) forming an aqueous slurry consisting essentially of (1) particles of an unplasticized partial polyvinyl acetal resin having a size such that at least 90% by weight of said particles will be retained on a 60-mesh screen (U. S. Sieve Series), said resin being the condensation product of polyvinyl alcohol and an aldehyde having 2 to 6 carbon atoms per molecule, (2) a water-insoluble ester plasticizer for said resin which is present in the amount of 10% to 50% by weight of said resin, and (3) water in an amount such that the weight ratio of (water):(resin plus plasticizer) is from 3:1 to 20:1; (b) agitating said aqueous slurry for a period of 10 to 100 minutes at a power input of at least 1 horsepower per 1000 gallons of slurry; (c) maintaining the temperature of said slurry from 20° C. to 65° C. during the agitation; and (d) recovering an aqueous slurry of non-bleeding, plasticized partial polyvinyl acetal resin particles containing at least 90% of the plasticizer originally added to said slurry.

2. The process of claim 1 in which the partial polyvinyl acetal resin is polyvinyl butyral containing 18%–25% by weight of unacetalized polyvinyl alcohol, not more than about 2% by weight of polyvinyl acetate, and the remainder is polyvinyl butyral; and in which the plasticizer is selected from the group consisting of triethylene glycol di(2-ethyl butyrate), di(beta-butoxy ethyl)adipate, and dibutyl sebacate.

3. A process for plasticizing polyvinyl butyral resin consisting essentially of (a) forming an aqueous slurry consisting of (1) unplasticized polyvinyl butyral particles which are of such a size distribution that at least 90% by weight of said particles are retained on a 60-mesh U. S. Sieve Series Screen, said polyvinyl butyral containing 18%–25% by weight of unacetalized polyvinyl alcohol, 0%–2% by weight of polyvinyl acetate, and the remainder polyvinyl butyral, (2) 0–50% by weight of said unplasticized resin of previously plasticized polyvinyl butyral, (3) 10%–50% by weight of said unplasticized resin of a plasticizer from the group consisting of triethylene glycol di(2-ethyl butyrate), di(beta-butoxy ethyl)adipate, and dibutyl sebacate, and (4) water in an amount such that the ratio of (water):(resin plus plasticizer) is from 4:1 to 10:1; (b) agitating said slurry for a period of 10–100 minutes at an agitation power input of 1–5 horsepower per 1000 gallons of slurry and at a temperature of 35° C. to 55° C.; and (c) recovering polyvinyl butyral containing at least 90% of the said plasticizer originally added to said slurry.

References Cited in the file of this patent

UNITED STATES PATENTS

| | | |
|---|---|---|
| 2,291,697 | Cox et al. | Aug. 4, 1942 |
| 2,720,501 | Van Ness | Oct. 11, 1955 |

UNITED STATES PATENT OFFICE
CERTIFICATE OF CORRECTION

Patent No. 2,864,784                         December 16, 1958

Barnard Mitchel Marks

It is hereby certified that error appears in the printed specification of the above numbered patent requiring correction and that the said Letters Patent should read as corrected below.

Columns 3 and 4, in the Table, tenth column thereof, under the heading "Percent plasticizer absorbed by resin", third item, for "9.9" read -- 95.9 --; column 5, line 48, after "not more" insert -- than about 2% by weight of vinyl acetate groups, --.

Signed and sealed this 31st day of March 1959.

(SEAL)

Attest:

KARL H. AXLINE                                           ROBERT C. WATSON

Attesting Officer                                     Commissioner of Patents